Patented Feb. 21, 1950

2,498,206

UNITED STATES PATENT OFFICE 2,498,206

PRODUCTION OF PARAFORMALDEHYDE

Bertrand W. Greenwald and Raymond K. Cohen, Pawhuska, Okla., assignors to Cities Service Oil Company, Bartlesville, Okla., a corporation of Delaware No Drawing. Application December 7, 1948, Serial No. 64,031

9 Claims. (Cl. 260—340)

This invention relates to the production of paraformaldehyde and more particularly to a method for the production of paraformaldehyde by the vacuum concentration of formaldehyde solutions.

The preparation of commercial paraformaldehyde is usually carried out by the vacuum concentration of aqueous formaldehyde solutions to produce a polymer meeting commercial specifications. The chemical composition of paraformaldehyde is best expressed by the type formula HO—$(CH_2O)_n$H. Depending on conditions of preparation it may contain 93 to 99 per cent $CH_2O$. Commercial paraformaldehyde, however, is specified to contain not less than 95 per cent by weight. Therefore, the polymer must contain at least 12 formaldehyde units per molecule on the average. At such high percentages of formaldehyde content a very slight change in formaldehyde content reflects a considerable change in the chain length. For example, a 93 per cent paraformaldehyde contains slightly over 8 formaldehyde units per molecule. Such a paraformaldehyde, if produced under conditions tending toward complete polymerization at this stage, cannot be further concentrated or dehydrated to produce a paraformaldehyde assaying 95 per cent or more $CH_2O$. This is probably due to the mechanics of the polymerization, monomeric or low molecular weight polymeric formaldehyde hydrates adding to the end of a higher polymeric chain, with splitting out of water. Thus, if polymerization is carried out under conditions such that a low concentration of monomers or low polymers is present when the major portion of the formaldehyde has polymerized to a degree represented by about eight $CH_2O$ to the molecule, further polymerization will be inhibited, and the resultant paraformaldehyde cannot be brought up to commercial specifications by further drying even at extremely high vacuum. It is therefore necessary to carry out the concentration of aqueous formaldehyde solutions under conditions favoring polymerization to chain lengths of 12 formaldehyde units or more.

We have succeeded in producing a paraformaldehyde meeting the commercial specifications of 95 per cent formaldehyde, by including an aging step, during which the formaldehyde in solution is allowed to polymerize to long chain length, followed by a final concentration of the formaldehyde solution to the desired strength. We have found that the best results are obtained when the formaldehyde solution is brought to a concentration of from about 55 to about 65 per cent by weight. It is then aged for a period of from about 8 to 20 hours at a temperature value measured in °C. which is nearly numerically equivalent to the percentage of formaldehyde in the solution. At the end of the aging step, the appearance of the formaldehyde solution is a slurry about one quarter in solid phase and three quarters in liquid phase.

We have also found that the aged formaldehyde solution should be cooled to approximately 50° C. if the concentration to commercial paraformaldehyde is to be carried out under vacuum conditions. If the concentration is carried out under high vacuum conditions at temperatures above 50° C., violent boiling will occur tending to carry formaldehyde overhead with consequent loss of material. If the aged mass is brought to a temperature below approximately 50° C. prior to concentration, for some reason, the recovery of formaldehyde as paraformaldehyde will be low, and the final product will not meet commercial specifications of 95 per cent strength.

The runs upon which the data in the following tables is based were made in a jacketed rotary vacuum drier having a capacity of about 250 gallons, vacuum being maintained by means of steam jets. The drier was equipped with a shaft having paddle arms designed to break up the paraformaldehyde into suitable sized lumps during the later stages of the drying operation. Hot water was circulated through the shaft, paddle arms and jacket of the drier by means of a circulating pump, so as to maintain the desired temperature of the formaldehyde during concentration and drying. The vacuum was regulated by bleeding air into the line from the jets to the receiver. Progress of drying was determined by breaking the vacuum and withdrawing samples through the top of the drier. When successive samples showed no increase in the $CH_2O$ content, the run was stopped and the paraformaldehyde removed.

The feed stock used in the following examples was a formaldehyde solution obtained from the products of partial oxidation of lower hydrocarbon fractions. This feed stock, which contained from about 37 to about 42 per cent formaldehyde was concentrated to the desired aging percentage. It should be understood, however, that while the examples following show a two-step concentration process, that formaldehyde solutions produced in the commercial manufacture of formaldehyde and having the desired 55 to 65 per cent concentration of formaldehyde may be subjected to our aging treatment without any preliminary concentration. It should also be understood that while the process as described carries out the preliminary concentration under vacuum that the formaldehyde may be concentrated to the desired degree by pressure distillation, prior to the aging step. While it is chemically possible to further concentrate the formaldehyde solution to a commercial paraformaldehyde under pressure conditions, this method of concentrating the solution is not preferred, due to mechanical difficulties.

As an example of a typical run under optimum operating conditions, 1,928 pounds of Formalin containing 41.3 per cent of formaldehyde was charged to the drier, and concentration was commenced under a pressure of 2.3 inches of mercury absolute, circulating water at 75° C. through the paddles and jacket. Concentration was continued until the formaldehyde concentration had reached 60.4 per cent. The vacuum was then broken and the mixture was held at a temperature of 65° C. for thirteen hours. The physical appearance of the mixture at this point was a slurry approximately one quarter in solid phase and three quarters in liquid phase. After aging, the slurry was cooled to 50° C., and was further concentrated and dried under a pressure of 1.5 inches of mercury absolute, with a jacket water temperature of 65° C., until successive samples showed no increase in $CH_2O$. The final product had an assay of 95.4 per cent formaldehyde, the paraformaldehyde recovery being 83.0 per cent based on the weight of formaldehyde charged to the drier.

Other similar runs are summarized in the following table, the aged solution being cooled in all cases to 50° C. prior to resuming concentration.

Table I

|  | 1 | 2 | 3 |
| --- | --- | --- | --- |
| Size of charge (lb.) | 1,652 | 1,930 | 1,930 |
| HCHO in charge (wt. per cent) | 42.7 | 41.8 | 40.6 |
| Hours for aging | 14 | 16 | 16 |
| Aging conc. (wt. per cent HCHO) | 55.0 | 60.0 | 59.9 |
| Aging temp. (°C) | 60 | 60 | 62 |
| Product Assay | 95.4 | 95.1 | 95.1 |
| Recovery in para | 80.2 | 82.6 | 82.6 |

We have found that the aging temperature as indicated in the above table may vary from the numerical value of the aging concentration by as much as 7° C. or so, without materially affecting the quality of the paraformaldehyde produced and without decreasing ultimate yields of paraformaldehyde. When, however, the aging temperature varies substantially from these limits, polymerization does not appear to proceed satisfactorily, and in most instances a paraformaldehyde meeting commercial specifications of 95 per cent formaldehyde cannot be produced by further vacuum concentration. The following table is based on runs during which the aging temperature and concentration of formaldehyde in the aging mixture was varied within and beyond the foregoing limits. Aging time was eight hours in all cases.

Table II

| Weight per cent $CH_2O$ | | Aging Temp. | Physical state of mixture at end of aging period |
| --- | --- | --- | --- |
| during aging | final product | | |
|  |  | °C. |  |
| 55.5 | 95.1 | 50±2 | 1/10-1/4 solid. |
| 66.3 | 92.8 | 50±2 | solid. |
| 56.0 | 93.8 | 75±3 | liquid. |
| 59.1 | 94.3 | 75±3 | Do. |
| 66.6 | 94.6 | 75±3 | 1/2 solid. |

We have found that the aging period is preferably eight hours or more, since aging for periods less than eight hours apparently does not allow sufficient time for polymerization. Thus, a solution containing 55.5 per cent formaldehyde was split into three samples, one sample being aged for two hours at 52° C., the second sample for four hours, and the third sample for eight hours. After concentration and drying until successive samples showed no increase in $CH_2O$ content, the first sample assayed 93.8 per cent $CH_2O$, the second 94.1 per cent $CH_2O$, and the third 95.1 per cent $CH_2O$. Prolonged aging does not adversely affect the quality of the formaldehyde produced. Obviously it would not be economic to age for any period longer than that necessary to produce a paraformaldehyde meeting commercial specifications.

We have also found that it is necessary to cool the aged material to about 50° C. prior to resuming concentration. If the material is not cooled, or if it is cooled to a temperature substantially below 50° C., before resuming concentration, we have found that losses of formaldehyde are increased. In addition, paraformaldehyde meeting commercial specifications of 95 per cent $CH_2O$ content is not produced when the aged material is cooled to a too low a temperature. Three runs illustrating this phenomenon are summarized in the following table.

Table III

| Aging concentration | Aging temperature | Cooled to— | Final product assay | Recovery as para |
| --- | --- | --- | --- | --- |
| Percent | °C. |  | Percent | Percent |
| 60.5 | 60 | 35° C. | 94.4 | 76.6 |
| 60.2 | 60 | not cooled. | 95.0 | 65.2 |
| 61.3 | 60 | 50° C. | 95.0 | 80.6 |

We have also investigated the effect of varying temperatures during the concentration and drying process. We have found that higher temperatures during the second stage concentration and drying are undesirable, since recoveries of formaldehyde as paraformaldehyde are generally low. However, too low concentration and drying temperatures are undesirable since they unduly lengthen the time necessary for concentration and drying. We have found that the most economical temperature range for the final concentration and drying step is between 50° C. and 60° C., when the drying is carried out at a pressure of approximately 1.5 inches of mercury absolute.

The following table shows the effect of various temperatures on recoveries.

Table IV

| Temperature | Wt. percent $CH_2O$ loss |
|---|---|
| 40 | 1.0 |
| 50 | 4.2 |
| 60 | 7.3 |
| 70 | 16.7 |
| 80 | 34.6 |

We have thus discovered a process which permits the production of a commercial grade of paraformaldehyde without serious loss of formaldehyde during the operation. The process is simple in operation, and requires no special equipment other than the standard vacuum concentrator commonly used in the production of commerical paraformaldehyde.

Having now described our invention, what we claim as new is:

1. The process for producing paraformaldehyde, including subjecting a formaldehyde solution to a first stage concentration, interrupting the concentration when the concentrate contains from about 55 to about 65 per cent formaldehyde by weight, holding the concentrate at a temperature expressed in °C. varying from the numerical value of the formaldehyde concentration by not more than 7 for a period of time sufficient to allow substantial polymerization of formaldehyde, and thereafter subjecting the concentrate to a second stage concentration and drying until a paraformaldehyde assaying not less than 95 per cent formaldehyde by weight is produced.

2. The process according to claim 1 in which the holding period is not less than about eight hours.

3. The process according to claim 1 in which both stages of concentration are carried out at pressures below about 2.5 inches of mercury absolute.

4. The process according to claim 3 in which the temperature of the material during the second stage concentration and drying is held at from about 50° C. to about 60° C.

5. The process for producing paraformaldehyde, including subjecting a formaldehyde solution to a first stage concentration, interrupting the concentration when the concentrate contains from about 55 to about 65 per cent formaldehyde by weight, holding the concentrate for a period of from about eight to about twenty hours at a temperature the numerical value of which, expressed in degrees C., varies from the numerical value of the formaldehyde concentration of the concentrate by not more than 7, and thereafter subjecting the concentrate to a second stage vacuum concentration and drying until a paraformaldehyde assaying not less than 95 per cent formaldehyde by weight is produced.

6. The process of claim 5 in which the second stage concentration and drying is carried out under conditions such that the temperature of the material being dried does not rise above 60° C. during the drying.

7. The process of claim 5 in which both stages of the concentration are carried out at pressures below about 2.5 inches of mercury absolute.

8. The process according to claim 5 in which the aged concentrate is brought to a temperature of about 50° C. prior to the second stage concentration and drying operation.

9. The process for producing paraformaldehyde including holding a formaldehyde solution containing from about 55 to about 65 per cent formaldehyde by weight at a temperature expressed in °C. varying from the numerical value of the formaldehyde concentration of the solution by not more than 7 for a sufficient time to allow a substantial polymerization, and thereafter subjecting the solution to concentration and drying until a paraformaldehyde assaying not less than 95 per cent formaldehyde by weight is produced.

BERTRAND W. GREENWALD.
RAYMOND K. COHEN.

No references cited.